US011107350B2

(12) United States Patent
Lisewski et al.

(10) Patent No.: US 11,107,350 B2
(45) Date of Patent: Aug. 31, 2021

(54) CARRIER AGNOSTIC RELAY FOR DELIVERING INFORMATION TO AUTONOMOUS VEHICLES

(71) Applicant: Verizon Patent and Licensing Inc., Arlington, VA (US)

(72) Inventors: Kevin Lisewski, Ramsey, NJ (US); Arvind Basra, Glen Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 555 days.

(21) Appl. No.: 16/038,934

(22) Filed: Jul. 18, 2018

(65) Prior Publication Data

US 2020/0027346 A1 Jan. 23, 2020

(51) Int. Cl.
| | |
|---|---|
| *H04W 4/04* | (2009.01) |
| *G08G 1/0967* | (2006.01) |
| *H04W 4/40* | (2018.01) |
| *H04W 4/70* | (2018.01) |
| *G07C 5/00* | (2006.01) |
| *G05D 1/00* | (2006.01) |
| *H04W 88/04* | (2009.01) |

(52) U.S. Cl.
CPC ..... *G08G 1/096791* (2013.01); *G05D 1/0088* (2013.01); *G07C 5/008* (2013.01); *H04W 4/40* (2018.02); *H04W 4/70* (2018.02); *H04W 88/04* (2013.01); *G05D 2201/0213* (2013.01)

(58) Field of Classification Search
None
See application file for complete search history.

(56) References Cited

U.S. PATENT DOCUMENTS

| | | | |
|---|---|---|---|
| 9,293,042 B1* | 3/2016 | Wasserman | G08G 1/09 |
| 9,628,565 B2* | 4/2017 | Stenneth | G08G 1/096758 |
| 10,852,153 B2* | 12/2020 | Yun | B62D 15/0285 |
| 2016/0152210 A1* | 6/2016 | Fulop | B60R 25/31 |
| | | | 701/36 |
| 2016/0203652 A1* | 7/2016 | Throop | G07C 5/008 |
| | | | 701/36 |
| 2020/0280827 A1* | 9/2020 | Fechtel | H04W 4/46 |

* cited by examiner

*Primary Examiner* — Jonathan M Dager

(57) ABSTRACT

A device receives a first message indicating that content was transmitted to a telemetry device, generates and sends a second message to a remote device. The device receives a third message from the remote device including first information identifying the remote device and second information identifying a neighbor device of the remote device, and generates and sends a fourth message to the remote device, causing the remote device to download the content via a link and send the fourth message to the neighbor device, which causes the neighbor device to download the content via the link. The device receives a fifth message from the remote device including third information indicating whether the remote device and the neighbor device downloaded the content via the link, and generates and sends, to the base station, a sixth message including the first information, the second information, and the third information.

20 Claims, 12 Drawing Sheets

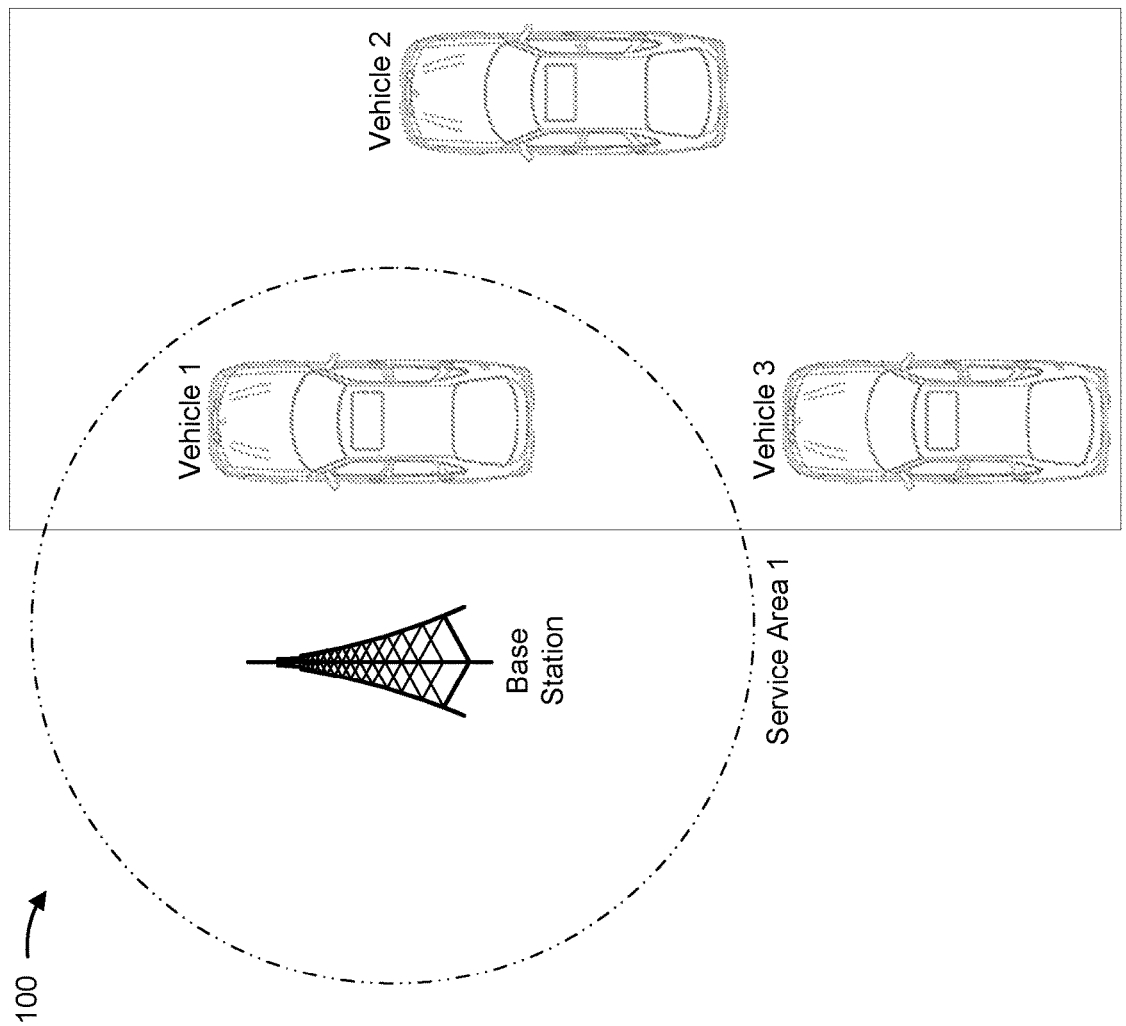

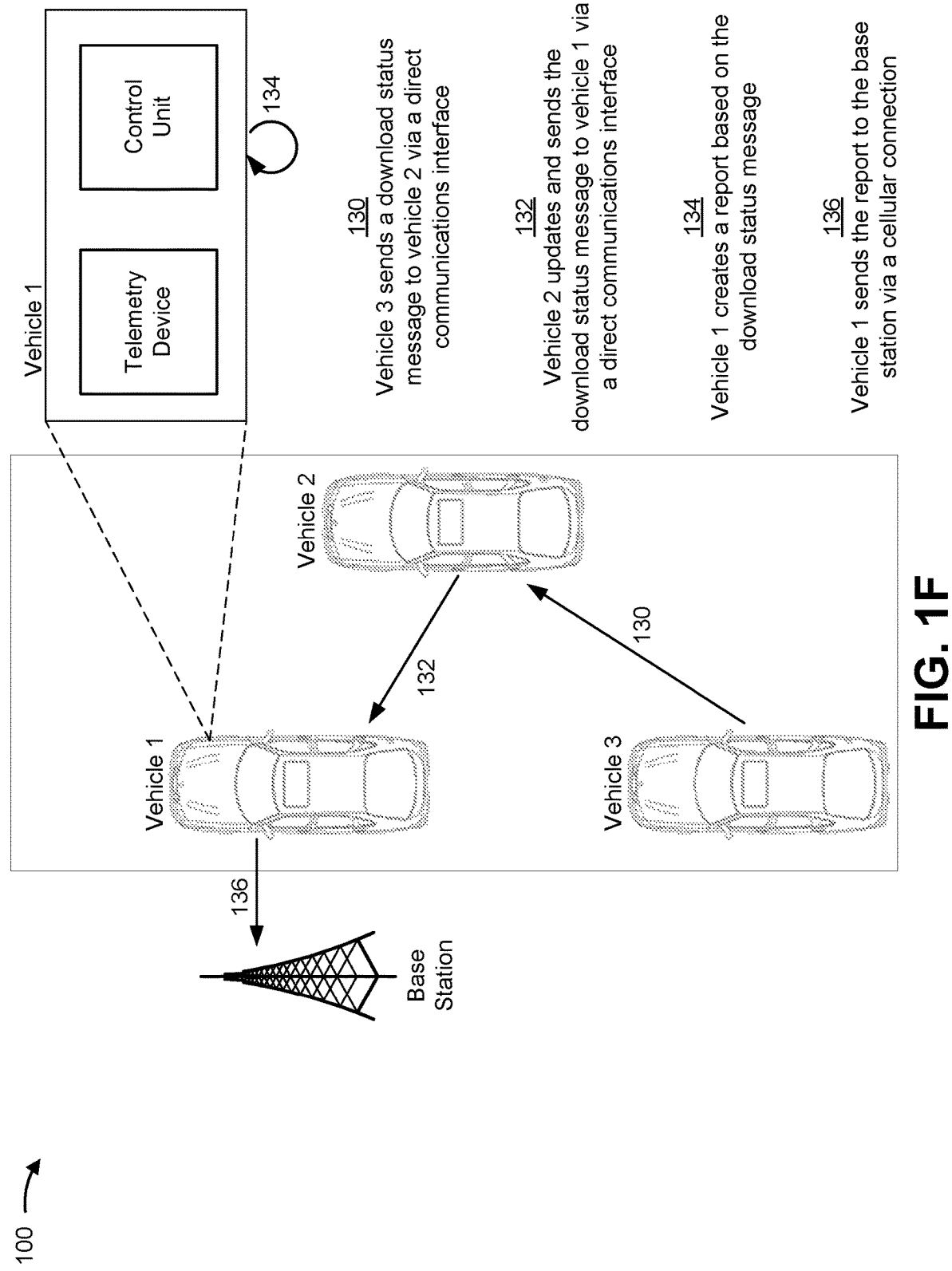

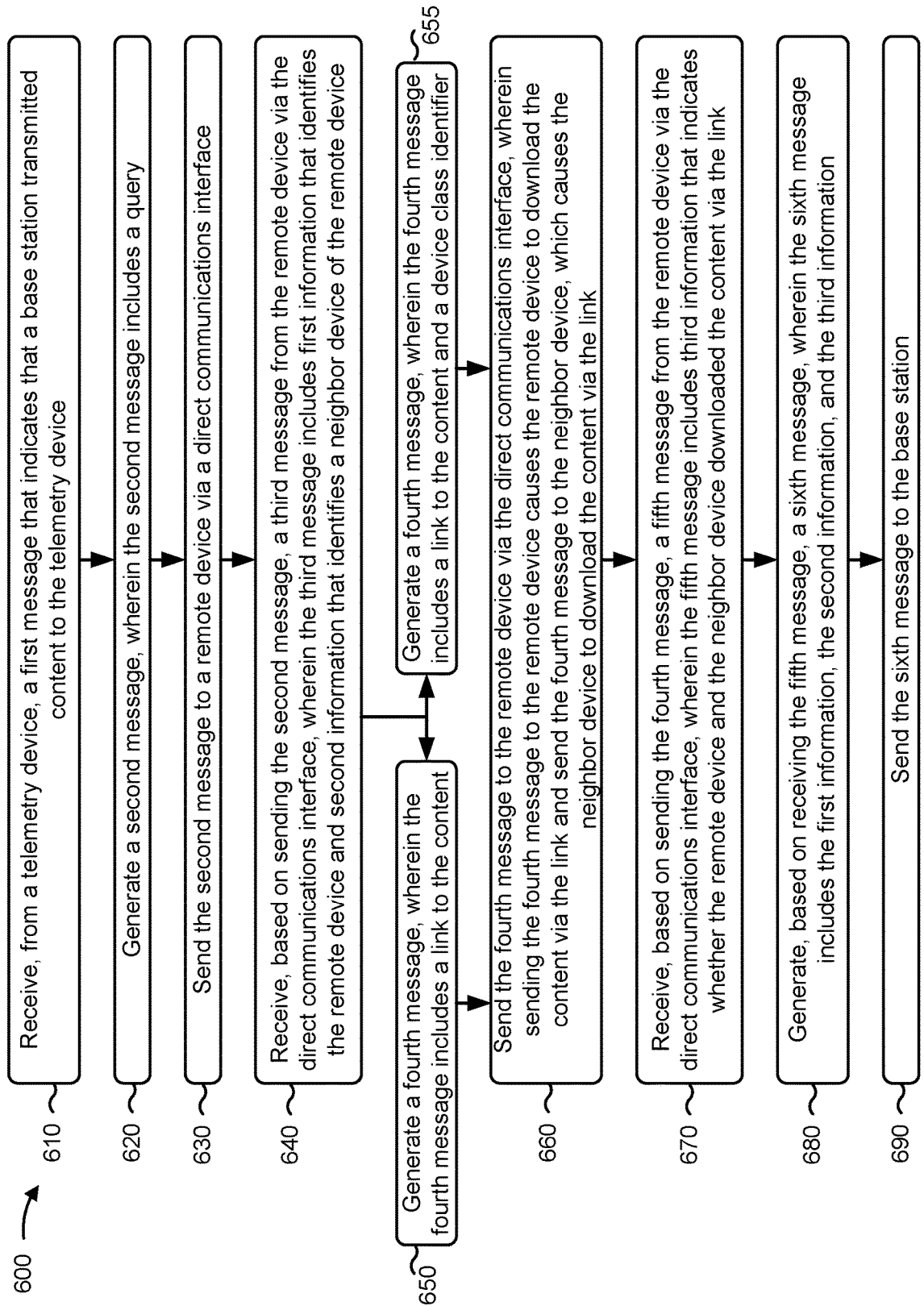

CARRIER AGNOSTIC RELAY FOR DELIVERING INFORMATION TO AUTONOMOUS VEHICLES

BACKGROUND

Vehicle to network (V2N) services can provide a wide area network interface (e.g., a long term evolution (LTE) interface) to connect end-user devices and vehicles to mobile network base stations and mobile core networks. Vehicle to vehicle (V2V) services can provide a direct communications interface (e.g., an LTE PC5 interface) that can connect vehicles to vehicles.

BRIEF DESCRIPTION OF THE DRAWINGS

FIGS. 1A-1F are diagrams of example implementations described herein.

FIG. 6 is a flow chart of an example process for a carrier agnostic relay for delivering information to autonomous vehicles.

DETAILED DESCRIPTION OF PREFERRED EMBODIMENTS

Figure 1B:
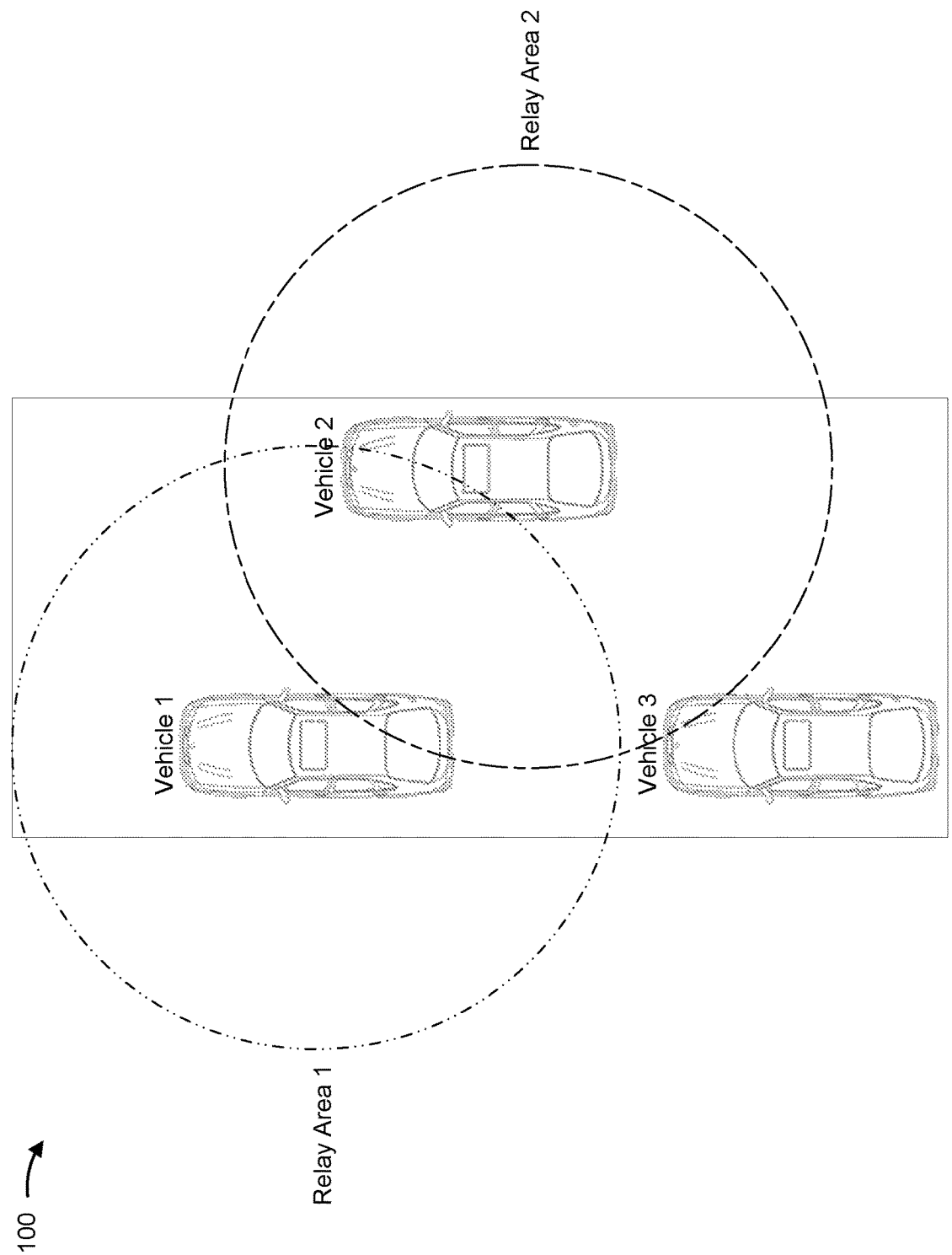

The following detailed description of example implementations refers to the accompanying drawings. The same reference numbers in different drawings can identify the same or similar elements.

Autonomous vehicles can rely on both internal data sources and external data sources during operation. With respect to internal data sources, autonomous vehicles can include a large number of embedded computers, hardware controllers, global positioning system (GPS) receivers, and connectivity components that each can generate and receive significant amounts of data.

In order to operate effectively, efficiently, and safely, autonomous vehicles might also receive, process, and/or interpret information associated with external data sources (e.g., content). For example, the information can include status data of nearby infrastructure, traffic data, data related to safety hazards, or the like. In order to utilize such information, autonomous vehicles might need to access a potentially large volume of information, and/or might need to access and/or process the information substantially instantaneously. In some cases, a provider of a cellular connection service can send the information via a cellular connection to autonomous vehicles that subscribe to the cellular connection service. However, in some cases, some of the autonomous vehicles may not subscribe to the cellular connection service provided by the provider, and therefore cannot receive the information from the provider via the cellular connection service. This can create a gap in ensuring that autonomous vehicles travelling on a road have the information that the autonomous vehicles need to operate effectively, efficiently, and safely, which can create dangerous driving conditions for all vehicles travelling on the road, regardless of whether the vehicles are operated autonomously or not. This can also create hazardous conditions for people, animals, and property that travel on the road (e.g., pedestrians that walk along or across the road on which the autonomous vehicles travel) and/or are located alongside the road (e.g., a house located at a corner of an intersection of the road on which the autonomous vehicles travel).

Some implementations described herein provide a system of a first autonomous vehicle for receiving information from a base station of a provider (e.g., via a long term evolution (LTE) multicast connection) and directly communicating with a system of a second autonomous vehicle to ensure that the system of the second autonomous vehicle and a system of a third autonomous vehicle receive the information. In some implementations, the system of the first autonomous vehicle can create and transmit messages to the system of the second autonomous vehicle via a direct communications interface (e.g., an LTE PC5 interface). In some implementations, the system of the first autonomous vehicle can receive messages from the system of the second autonomous vehicle via the direct communications interface. In some implementations, the system of the second autonomous vehicle can send messages to and receive message from the system of the third autonomous vehicle via the direct communications interface. In some implementations, the system of the first autonomous vehicle can determine identifying information of the second autonomous vehicle and the third autonomous vehicle by generating a query message, sending the query message to the system of the second autonomous vehicle, and receiving a query response message from the system of the second autonomous vehicle. In some implementations, the system of the first autonomous vehicle can generate and send a relay message to the system of the second autonomous vehicle that includes a link to the information, which causes the system of the second autonomous vehicle to download the information via the link and forward the relay message to the system of the third autonomous vehicle, which causes the system of the third autonomous vehicle to download the information via the link. In some implementations, the system of the second autonomous vehicle can send a status message to the system of the first autonomous vehicle that indicates whether the system of the second autonomous vehicle and the system of the third autonomous were able to download the information. In some implementations, the system of the first autonomous vehicle can send a report to the base station of the provider that indicates whether the information was delivered to the system of the second autonomous vehicle and the system of the third autonomous vehicle.

In this way, some implementations described herein permit information transmitted by the base station of the provider to be delivered to the system of the first autonomous vehicle, the system of the second autonomous vehicle, and the system of the third autonomous vehicle. In this way, some implementations described herein allow the system of the first autonomous vehicle to facilitate delivery of the information to the system of the second autonomous vehicle and the system of the third autonomous vehicle, even if the second autonomous vehicle and the third autonomous vehicle are outside a service area of the base station and/or the second autonomous vehicle and the third autonomous vehicle do not subscribe to the cellular connection service associated with the base station of the provider. In this way, some implementations allow for efficient network usage and efficient use of network bandwidth by efficient distribution of the information to the system of the first autonomous vehicle, the system of the second autonomous vehicle, and the system of the third autonomous vehicle. In this way, some implementations require reduced communication and/or signaling relative to communications between the base station and the system of the first autonomous vehicle, the system of the second autonomous vehicle, and the system of the third autonomous vehicle. In this way, some implementations described herein conserve processor and/or memory resources of devices associated with the autonomous vehicles and base station, and/or conserve network resources. In this way, some implementations increase the amount of information that is available to the autonomous vehicles, which can improve effectiveness, efficiency, and safety of how the autonomous vehicles operate.

FIGS. 1A-1F are diagrams of example implementations 100 described herein. As shown in FIG. 1A, example implementation 100 can include a base station and a set of vehicles (e.g., vehicle 1, vehicle 2, and vehicle 3). The set of vehicles can include autonomous vehicles, semi-autonomous vehicles (e.g., vehicles that are autonomous in a particular geographic area, at a particular speed, for a particular purpose, and/or the like), and/or vehicles that utilize an autonomous application (e.g., autonomous driving systems, advanced driver assistance systems, autonomous braking systems, advanced braking assistance systems, and/or the like). As shown, the set of vehicles can travel on a road (e.g., a dirt road, a city street, a highway, and/or the like). In some implementations, each vehicle of the set of vehicles can have a system to facilitate communicating with the base station, via a cellular connection, and/or the system of each of the other vehicles of the set of vehicles, via direct communications, while traveling on the road. In some implementations, the system can comprise one or more than one device.

As further shown in FIG. 1A, the base station can have a service area. In some implementations, a service area can refer to a particular geographic area, an area associated with a geofence, an area in which a base station can provide a cellular connection to communicate with the system of a vehicle, a set of cells covered by a set of base stations, and/or the like. For example, as shown, the base station can have a service area (e.g., service area 1) in which the base station can provide a cellular connection to communicate with the system of vehicle 1 via multicast transmissions. Vehicle 2 and vehicle 3 can be outside the service area and therefore the systems of vehicle 2 and vehicle 3, respectively, are unable to communicate with the base station via the cellular connection. In some implementations, vehicle 2 and/or vehicle 3 can be within the service area of the base station, but the systems of vehicle 2 and/or vehicle 3, respectively, cannot communicate with the base station via the cellular connection because the systems of vehicle 2 and/or vehicle 3 do not subscribe to a cellular connection service that provides the cellular connection associated with the base station.

As shown in FIG. 1B, a vehicle can have a relay area. In some implementations, a relay area can refer to a particular geographic area around the vehicle (e.g., a radius around the vehicle), an area associated with a geofence around the vehicle, an area in which the system of the vehicle can communicate with the system of another vehicle via direct communications, and/or the like. For example, as shown, vehicle 1 can have a relay area (e.g., relay area 1) in which the system of vehicle 1 can communicate with the system of vehicle 2 via direct communications (e.g., via a long term evolution (LTE) PC5 interface, an Institute of Electrical and Electronics Engineers (IEEE) 802.11p interface, and/or the like). As shown, vehicle 2 can have a relay area (e.g., relay area 2) in which the system of vehicle 2 can communicate with the system of vehicle 1 and/or the system of vehicle 3 via direct communications. In some implementations, vehicle 3 can have a relay area in which the system of vehicle 3 can communicate with the system of vehicle 2 via direct communications. In some implementations, a vehicle can have a relay area in which the system of the vehicle can communicate with the systems of multiple vehicles via direct communications.

Figure 1C:
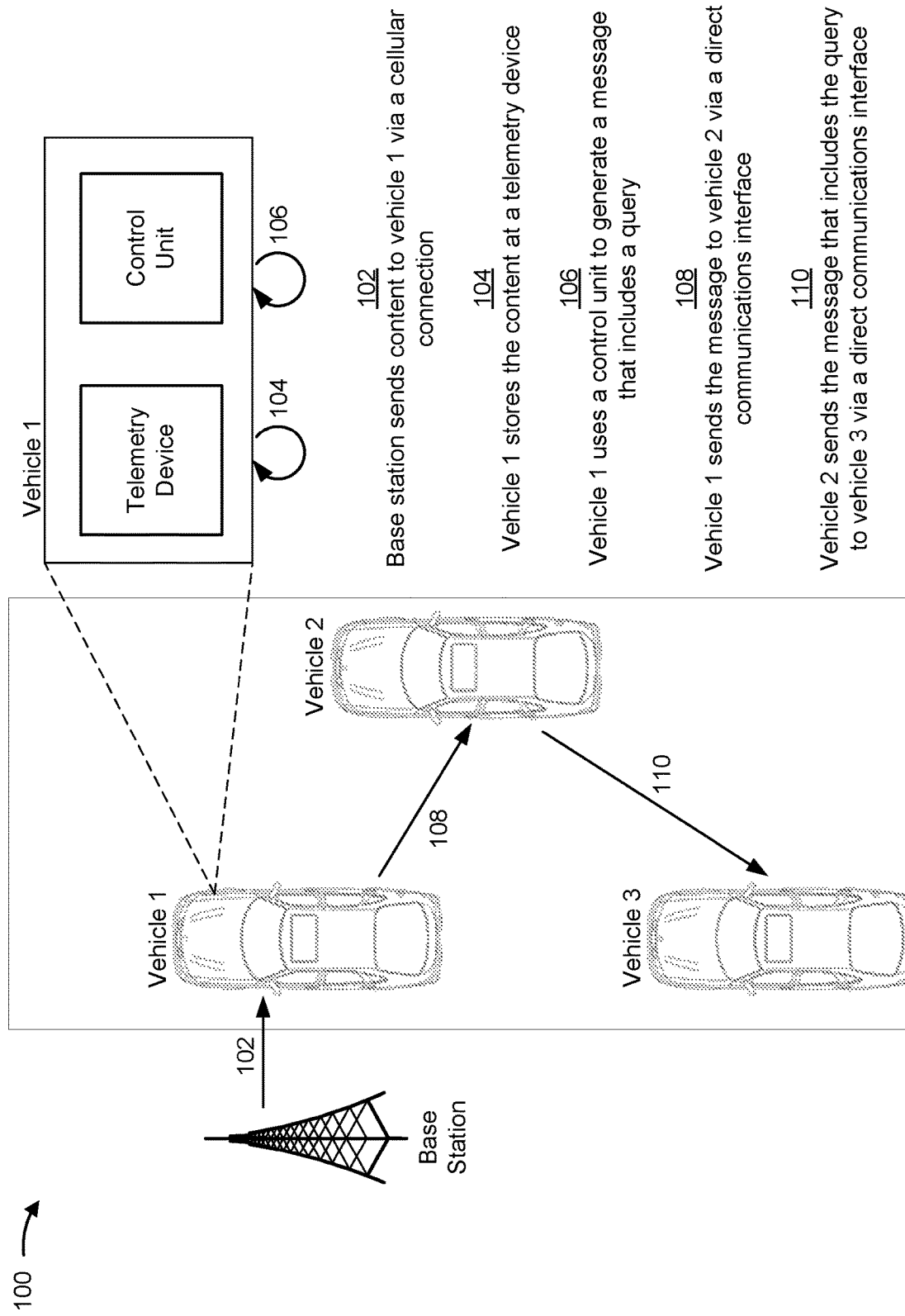

As shown in FIG. 1C, the base station can attempt to deliver content to the systems of a set (e.g., tens, hundreds, thousands, etc.) of vehicles. In some implementations, the content can be sent via a multicast transmission (e.g., an LTE multicast transmission) from an Evolved Multimedia Broadcast Multicast Services (eMBMS) core via the base station to the systems of a set of vehicles. In some implementations, the content can include information concerning status data of nearby infrastructure, traffic data, data related to safety hazards, and/or the like. In some implementations, the set of vehicles can include a first vehicle (e.g., vehicle 1), such that the first vehicle is within the service area of the base station and the system of the first vehicle subscribes to the cellular connection service associated with the base station. The system of the first vehicle therefore can communicate with the base station via the cellular connection. In some implementations, the set of vehicles can include a second vehicle (e.g., vehicle 2), such that the second vehicle is outside of the service area of the base station, but within the relay area of the first vehicle. In some implementations, the set of vehicles can include multiple (e.g., tens, hundreds, thousands, etc.) second vehicles, where each of the second vehicles is outside of the service area of the base station, but within the relay area of the first vehicle. For clarity, this description provides examples of some implementations that include the system of a single second vehicle, but the description is applicable to implementations that include the systems of multiple second vehicles. In some implementations, the set of vehicles can include a third vehicle (e.g., vehicle 3), such that the third vehicle is outside the service area of the base station and outside the relay area of the first vehicle, but within the relay area of the second vehicle. In some implementations, the set of vehicles can include multiple (e.g., tens, hundreds, thousands, etc.) third vehicles, where each of the third vehicles is outside of the service area of the base station and outside the relay area of the first vehicle, but within the relay area of the second vehicle. For clarity, this description provides examples of some implementations that include the system of a single third vehicle, but the description is applicable to implementations including the systems of multiple third vehicles.

In some implementations, the system of each vehicle (e.g., the first vehicle, the second vehicle, the third vehicle, and/or the like) can include a control unit and/or a telemetry device. In some implementations, the control unit can include one or more electronic control units, sensors, embedded devices, and/or the like. In some implementations, the telemetry device can receive, via a vehicle communication network (VCN), telemetry information associated with the control unit. For example, the control unit can provide the telemetry information to the telemetry device during operation of the vehicle. In some implementations, the telemetry device can receive telemetry information from hundreds of control units of the vehicle. In some implementations, the telemetry device can receive content transmitted from the base station via the cellular connection. In some implementations, the telemetry device can send the content to the control unit via the VCN, and the control unit can process the content to affect the driving behavior of the vehicle. In some implementations, the control unit and/or the telemetry device can generate and send messages to and receive messages from a control unit and/or a telemetry device of another vehicle via a direct communications interface. For example, the control unit can generate an LTE PC5 message and send the message to the control unit of another vehicle via the LTE PC5 communications interface. In some implementations, the control unit can include a message manager that can generate and send messages to and receive messages from a control unit of another vehicle via the direct communications interface.

As shown by reference number 102, a base station can transmit content to the system of a first vehicle (e.g., vehicle 1). In some implementations, the base station can transmit the content to the system of the first vehicle using a unicast, broadcast, and/or multicast cellular connection. For example, the base station can transmit the content, which indicates a traffic jam on the road ahead, to the system of vehicle 1 using an LTE multicast connection. In some implementations, the system of the first vehicle can receive the content at the telemetry device associated with the first vehicle. As shown by reference number 104, the first vehicle can store the content at the system of the first vehicle. For example, the first vehicle can store the content at the telemetry device associated with the first vehicle, which can include a multicast client component for receiving the content from the base station and a telemetry repository component for storing the content.

In some implementations, the telemetry device of the first vehicle can send a message (e.g., a first message) to the control unit of the first vehicle to indicate that the base station transmitted the content to the telemetry device at the first vehicle. For example, the telemetry device of the first vehicle can use a VCN interface to send the message to the control unit of the first vehicle via the VCN of the first vehicle. In some implementations, the control unit of the first vehicle can check to see whether the base station transmitted content to the system of the first vehicle (by, e.g., sending a query to the telemetry device of the first vehicle on a schedule (e.g., every second, every 10 seconds, every 100 seconds, and/or the like) regarding whether new content has been received by the telemetry device of the first vehicle via the VCN of the first vehicle).

As shown by reference number 106, the control unit of the first vehicle can receive the message that indicates that the base station transmitted content to the telemetry device of the first vehicle. In some implementations, the control unit of the first vehicle can generate a message that includes a query (e.g., a second message). For example, the message can include a query to identify which vehicles are neighbor vehicles of the first vehicle. In some implementations, a vehicle can be a neighbor vehicle of the first vehicle if the vehicle is located within the relay area (e.g., relay area 1) of the first vehicle. In some implementations, a vehicle can be a neighbor vehicle of the first vehicle if the vehicle is located within the relay area of the first vehicle and/or if the vehicle is located within the relay area (e.g., relay area 2) of a vehicle that is within the relay area of the first vehicle. In some implementations, a vehicle can be a neighbor vehicle of the first vehicle if the vehicle is located within the relay area of the first vehicle and/or if the vehicle is located within the relay area of another neighbor vehicle.

As shown by reference number 108, the system of the first vehicle can send the message that includes the query to the system of the second vehicle. For example, the first vehicle can use the control unit of the first vehicle to send the message that includes the query to the control unit of the second vehicle via a direct communications interface (e.g., an LTE PC5 interface). The message that includes the query can be received by the system of the second vehicle (e.g., the telemetry device(s) and/or control unit(s) of the second vehicle). In some implementations, the direct communications interface can be an LTE PC5 interface, an IEEE 802.11p interface, and/or the like. As shown by reference number 110, the system of the second vehicle can send the message that includes the query to the system of the third vehicle in a similar manner to that described herein in relation to reference number 108.

Figure 1D:
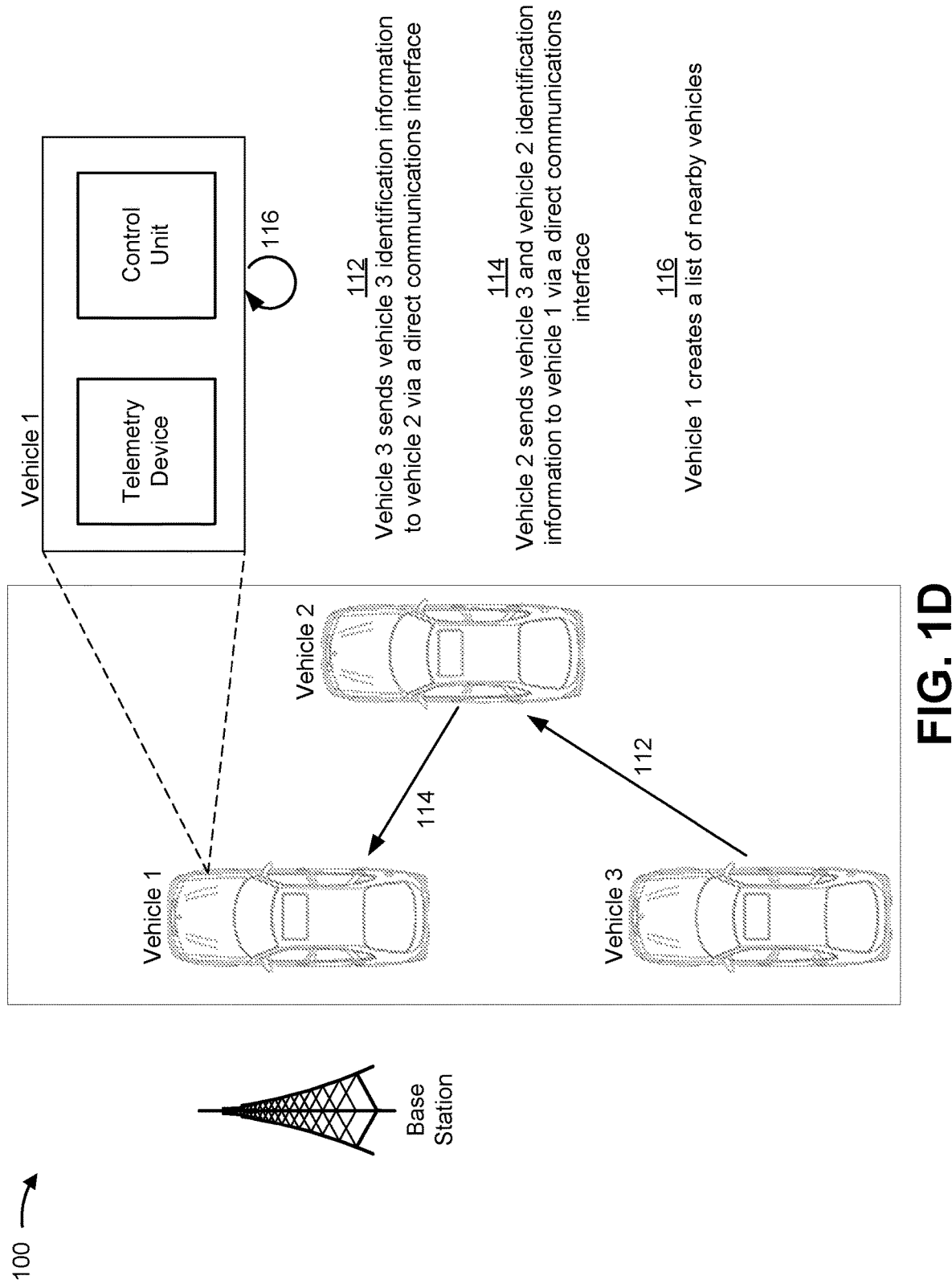

As shown in FIG. 1D, the neighbor vehicles of the first vehicle send identification information to the first vehicle. As shown by reference number 112, the system of the third vehicle can process the message that includes the query and, in response, create a message that includes identification information that identifies the third vehicle. In some implementations, the identification information that identifies the third vehicle can include a make, a model, a model year, and/or the like of the third vehicle. In some implementations, the identification information that identifies the third vehicle can include a device class (e.g., whether the third vehicle is a consumer vehicle, a commercial vehicle, a vehicle for smart infrastructure, and/or the like) of the third vehicle, a provider of the third vehicle (e.g., the fleet owner of the third vehicle), and/or the like. For example, the control unit of the third vehicle can create a message that includes identification information that includes a make, a model, and a model year of the third vehicle. In some implementations, the system of the third vehicle can send the message that includes the identification information that identifies the third vehicle to the system of the second vehicle via the direct communications interface. For example, the control unit of the third vehicle can send the message that includes identification information that includes the make, model, and model year of the third vehicle to the control unit of the second vehicle via the LTE PC5 interface.

In some implementations, the system of the second vehicle can receive, from the system of the third vehicle via the direct communications interface, the message (e.g., a third message) that includes the identification information that identifies the third vehicle. As shown by reference number 114, the system of the second vehicle can process the message that includes the identification information that identifies the third vehicle and modify the message to also include identification information that identifies the second vehicle. In some implementations, the system of the second vehicle can create a new message that includes the identification information that identifies the second vehicle and identification information that identifies the third vehicle. In some implementations, the identification information that identifies the second vehicle can include a make, a model, a model year, a device class, a provider, and/or the like of the second vehicle. For example, the message that includes the identification information that identifies the second vehicle and the identification information that identifies the third vehicle can include information that identifies the device class (e.g., the second vehicle is a commercial vehicle) of the second vehicle and the make and model of the third vehicle. In some implementations, the system of the second vehicle can send the message that includes the identification information that identifies the second vehicle and identification information that identifies the third vehicle to the system of the first vehicle via the direct communications interface.

In some implementations, the system of the first vehicle can receive the message (e.g., the third message) that includes the identification information that identifies the second vehicle (e.g., first information) and identification information that identifies the third vehicle (e.g., second information) from the system of the second vehicle via the direct communications interface. As shown by reference number 116, the system of the first vehicle can process the message (e.g., the third message) that includes the identification information that identifies the third vehicle and the identification information that identifies the second vehicle to create a list of neighbor vehicles of the first vehicle and identification information that identifies each neighbor vehicle. For example, the system of the first vehicle can receive the message that includes identification information that identifies the second vehicle and the third vehicle and create a list that indicates that the second vehicle and the third vehicle are neighbor vehicles of vehicle 1. In some implementations, the system of the first vehicle can send the list of neighbor vehicles to the base station via the cellular connection. In some implementations, the system of the first vehicle can send the list of neighbor vehicles to the eMBMS core via the base station.

Figure 1E:
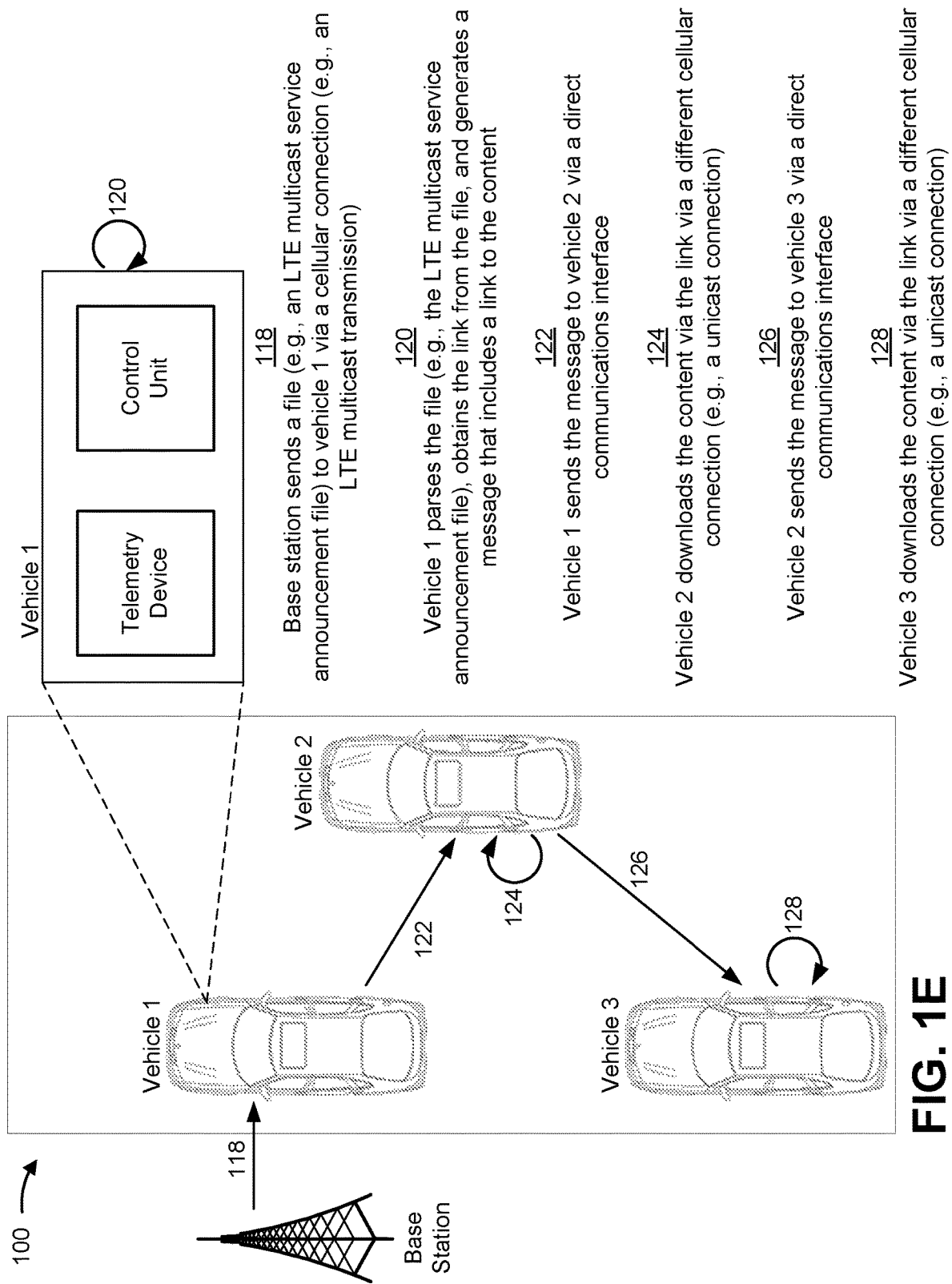

As shown in FIG. 1E, the base station can send a file to the first vehicle to facilitate delivery of the content to the neighbor vehicles of the first vehicle. As shown by reference number 118, the base station can send the file to the system of the first vehicle via the cellular connection. In some implementations, the eMBMS core can send the file via the base station to the system of the first vehicle via a multicast transmission (e.g., an LTE multicast transmission). For example, the eMBMS core, via the base station, can send a multicast service announcement file to the system of the first vehicle via an LTE multicast connection. In some implementations, the file can include a link to the content. For example, the file can include a uniform resource locator (URL) link to the content.

As shown by reference number 120, the system of the first vehicle can parse the file to determine the link to the content. For example, the system of the first vehicle can parse the multicast service announcement file to determine the link to the content. In some implementations, the system of the first vehicle can generate a message that includes the link to the content. For example, the control unit of the first vehicle can create a message that includes the URL link to the content. In some implementations, the message that includes the link can include information that identifies the first vehicle. In some implementations, the message that includes the link can include a device class identifier, such that the message that includes the link can be read only by the system of a vehicle of a device class indicated by the device class identifier.

As shown by reference number 122, the system of the first vehicle can send the message that includes the link (e.g., a fourth message) to the system of the second vehicle via the direct communications interface. For example, the control unit of the first vehicle can send the message that includes the URL link to the content to the control unit of the second vehicle via an LTE PC5 interface. In some implementations, sending the message that includes the link to the content causes the system of the second vehicle to download the content via the link (e.g., by communicating with another base station via a cellular connection) and send the message that includes the link to the content to the system of the third vehicle, which causes the system of the third vehicle to download the content via the link in a similar manner as the system of the second vehicle.

As shown by reference number 124, the system of the second vehicle can receive the message that includes the link to the content from the system of the first vehicle via the direct communications interface. In some implementations, the system of the second vehicle can parse the message that includes the link, determine the link to the content, and download the content via the link. For example, the control unit of the second vehicle can parse the message that includes the URL link to the content, determine the URL link to the content, and download the content via the URL link over a cellular connection (e.g., a unicast connection and/or the like) with another base station. In some implementations, where the message that includes the link also includes the device class identifier, the system of the second vehicle can download the content via the link only if the device class of the second vehicle matches the device class identifier.

As shown by reference number 126, the system of the second vehicle can send the message that includes the link to the system of the third vehicle via the direct communications interface. In some implementations, the system of the second vehicle can add information that identifies the second vehicle to the message that includes the link before sending the message that includes the link to the system of the third vehicle via the direct communications interface.

As shown by reference number 128, the system of the third vehicle can receive the message that includes the link to the content from the system of the second vehicle via the direct communications interface. In some implementations, the system of the third vehicle can parse the message that includes the link, determine the link to the content, and download the content via the link over a cellular connection with another base station. In some implementations, where the message that includes the link also includes the device class identifier, the system of the third vehicle can download the content via the link only if the device class of the third vehicle matches the device class identifier.

As shown in FIG. 1F, the system of the first vehicle determines whether the content was delivered to the neighbor vehicles of the first vehicle and sends a report to the base station. As shown by reference number 130, the system of the third vehicle can create a status message that includes information that indicates whether the system of the third vehicle was able to download the content via the link. In some implementations, the system of the third vehicle can send the status message to the system of the second vehicle via the direct communications interface. In some implementations, the system of the second vehicle can receive the status message via the direct communications interface. As shown by reference number 132, the system of the second vehicle can update the status message to include information that indicates whether the system of the second vehicle was able to download the content via the link. In some implementations, the system of the second vehicle can send the status message to the first vehicle via the direct communications interface.

In some implementations, the system of the first vehicle can receive the status message (e.g., a fifth message) from the second vehicle via the direct communications interface. In some implementations, the status message includes information that indicates whether the systems of the second vehicle and the third vehicle, respectively, were able to download the content via the link (e.g., third information). As shown by reference number 134, the system of the first vehicle can generate a report that includes the identification information that identifies the second vehicle (e.g., the first information), the identification information that identifies the third vehicle (e.g., the second information), and/or the information that indicates whether the systems of the second vehicle and the third vehicle, respectively, were able to download the content via the link (e.g., the third information). For example, the system of the first vehicle can create a report that includes identification information that identifies the second vehicle and the third vehicle and whether the system of the second vehicle and the system of the third vehicle were able to download the content via the link. As shown by reference number 136, the system of the first vehicle can send the report (e.g., a sixth message) to the base station via the cellular connection. In some implementations, the system of the first vehicle can send the report to the eMBMS core via the base station.

In this way, some implementations described herein permit delivery of content to a system of a first vehicle, a system of a second vehicle that is a neighbor vehicle of the first vehicle, and a system of a third vehicle that is a neighbor vehicle of the second vehicle. In this way, some implementations described herein allow the system of the first vehicle to facilitate delivery of the content, which the system of the first vehicle received from a base station via a cellular connection, to the system of the second vehicle and the system of the third vehicle even if the second vehicle and the third vehicle are outside a service area of the base station and/or the system of the second vehicle and the system of the third vehicle do not subscribe to a cellular connection service associated with the base station. In this way, some implementations allow for efficient network usage and efficient use of network bandwidth by efficient distribution of the content to the system of the first vehicle, the system of the second vehicle, and the system of the third vehicle. In this way, some implementations require reduced communication and/or signaling relative to communications between the base station and the system of the first vehicle, the system of the second vehicle, and the system of the third vehicle. In this way, some implementations described herein conserve processor and/or memory resources of the systems associated with the first vehicle, the second vehicle, and the third vehicle and the base station and/or conserve network resources. In this way, some implementations increase the amount of information that is available to the first vehicle, the second vehicle, and the third vehicle, which can improve effectiveness, efficiency, and safety of how the first vehicle, the second vehicle, and the third vehicle operate.

As indicated above, FIGS. 1A-1F are provided merely as examples. Other examples are possible and can differ from what was described with regard to FIGS. 1A-1F.

Figure 2:
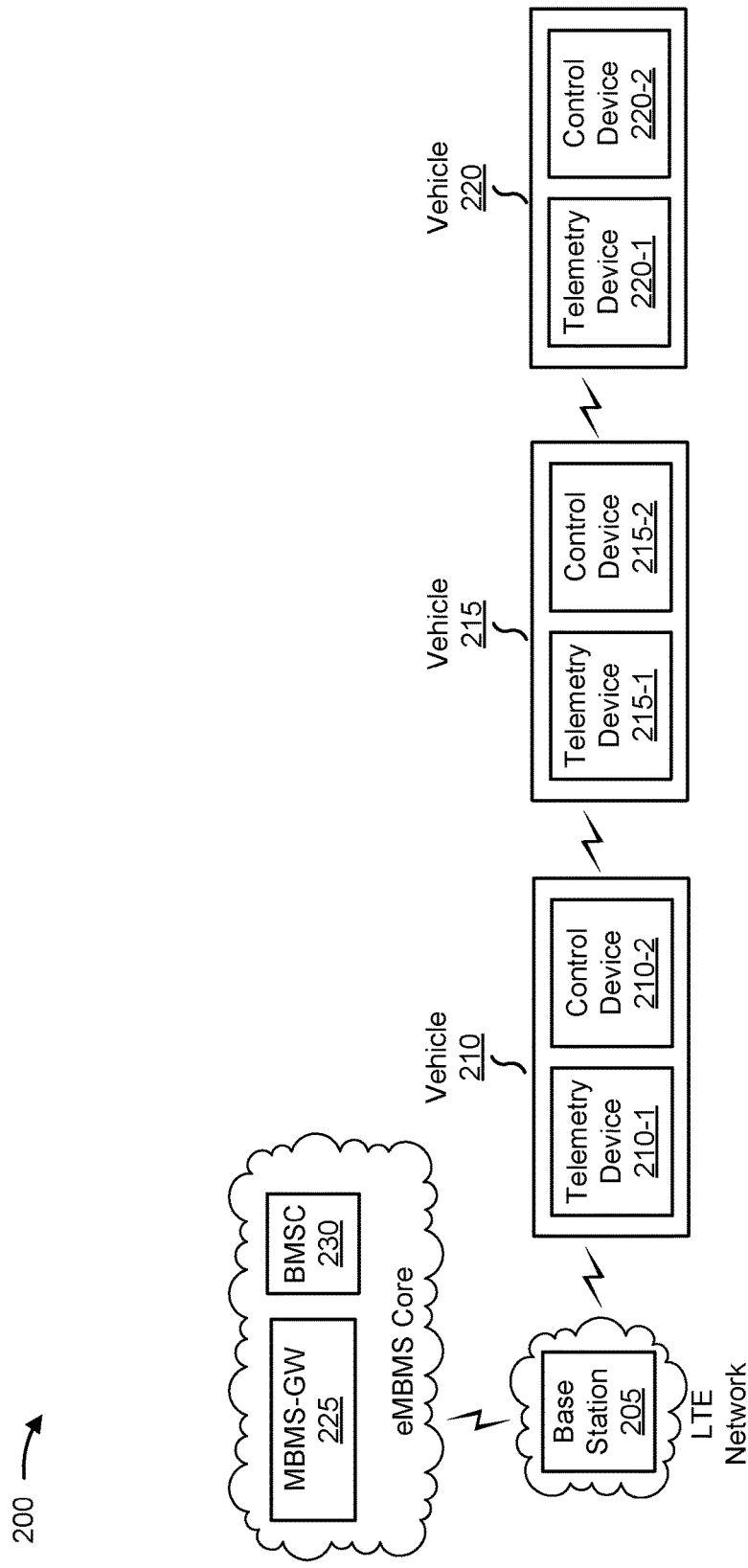
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a base station 205, a vehicle 210, which includes a telemetry device 210-1 and a control device 210-2, a vehicle 215, which includes a telemetry device 215-1 and a control device 215-2, a vehicle 220, which includes a telemetry device 220-1 and a control device 220-2, a Multimedia Broadcast/Multicast Service Gateway (MBMS-GW) 225, a Broadcast-Multicast Service Center device (BMSC) 230. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network or a third generation (3G) network.

Environment 200 includes an evolved packet system (EPS) that includes an LTE network, an evolved packet core (EPC), and/or an Evolved Multimedia Broadcast Multicast Services (eMBMS) core that operates based on a third generation partnership project (3GPP) wireless communication standard.

The LTE network includes a radio access network (RAN) that includes one or more base stations 205 that take the form of evolved Node Bs (eNBs) via which vehicle 210 communicates with the EPC and/or the eMBMS.

The eMBMS core can include MBMS-GW 225 and/or BMSC 230 that enable the eMBMS core to communicate with vehicle 210 using MBMS in association with the LTE network.

In some implementations, the eMBMS core can permit multicast services, such as unidirectional downlink transmissions from a cell to a set of vehicles 210 (e.g., associated with a service area). Each vehicle 210 can receive the downlink data (e.g., content) using the same set of air-interface resources. In some implementations, the eMBMS core can permit multicast services, such as unidirectional downlink transmissions from a cell to a set of vehicles 210 (e.g., associated with a service area). In some implementations, vehicle 210 might be required to perform specific procedures prior to receiving downlink data associated with a multicast service implemented by the eMBMS core. For example, vehicle 210 can perform subscription and/or joining procedures prior to receiving downlink data associated with a multicast service. In this way, the eMBMS core can provide a dedicated and secure network path for multicast transmissions to a particular service area. As used herein, a service area can refer to an area in which downlink data belonging to a specific eMBMS is transmitted.

In some implementations, eMBMS core can provide MBMS over a single frequency network (MBSFN), which corresponds to the simulcast transmission of MBMS data. For example, an MBSFN can provide identical data streams from multiple time synchronized base stations 205 using the same RF carrier. In this way, the eMBMS core provides a network path for the downlink multicast delivery of downlink data within a service area, and provides dedicated and secure transmission of the downlink data to a service area and/or a set of service areas.

Base station 205 includes one or more devices capable of transferring traffic destined for and/or received from vehicle 210. In some implementations, base station 205 can include an eNB associated with the LTE network that receives traffic from and/or sends traffic on the LTE network. Additionally, or alternatively, one or more base stations 205 can be associated with a RAN that is not associated with the LTE network. Base station 205 can send traffic to and/or receive traffic from vehicle 210 via an air interface. In some implementations, base station 205 can include a small cell base station, such as a base station of a microcell, a picocell, and/or a femtocell.

Vehicle 210 includes one or more devices (e.g., telemetry device 210-1, control device 210-2, and/or the like) capable of communicating with base station 205 and/or a network (e.g., the LTE network). For example, telemetry device 210-1 can include a wireless communication device, a telematics device, a radiotelephone, a personal communications system (PCS) terminal (e.g., that can combine a cellular radiotelephone with data processing and data communications capabilities), a smart phone, a laptop computer, a tablet computer, and/or a similar device. In some implementations, telemetry device 210-1 includes one or more machine-to-machine (M2M) devices and/or one or more Internet of Things (IoT) devices (e.g., any "thing" in the IoT). Telemetry device 210-1 can send traffic to and/or receive traffic from a network (e.g., the LTE network via base station 205).

Vehicle 210 includes one or more devices (e.g., telemetry device 210-1, control device 210-2, and/or the like) capable of communicating with another vehicle (e.g., vehicle 215). For example, control device 210-2 can use short-range ad hoc and/or direct communications (e.g., LTE PC5 communications, IEEE 802.11p communications, and/or the like) to send traffic to and/or receive traffic from vehicle 215.

Vehicle 210 includes one or more devices capable of receiving, generating, processing, storing, and/or providing telemetry information and/or service area information (e.g., control device 210-2). For example, control device 210-2 can include an electronics control unit (ECU) (e.g., an engine control module (ECM), a powertrain control module (PCM), a transmission control module (TCM), a brake control module (BCM), a speed control unit (SCU), a telematics control unit (TCU), a transmission control unit (TCU), a battery management system, an electronic power steering control unit (PSCU), or another control module), a sensor (e.g., a fuel pressure sensor, an engine temperature sensor, a tire pressure sensor, or another sensor), or the like.

In some implementations, control device 210-2 can include an embedded device associated with controlling one or more systems or sub-systems of a vehicle, such as an engine electronics system (e.g., a fuel injection rate control system, an emission control system, a turbocharger control system, a throttle control system, and/or the like), a transmission electronics systems (e.g., a gear shift system, a clutch system, and/or the like), a chassis electronics system (e.g., an anti-lock braking system (ABS), a traction control system (TCS), an electronic brake distribution (EBD) system, an electronic stability program (ESP) system, and/or the like), a safety system (e.g., an airbag system, a hill descent control system, an emergency brake assist system, and/or the like), a driver assistance system (e.g., an advanced driver-assistance system (ADAS), a lane assist system, a speed assist system, a blind spot detection system, a park assist system, an adaptive cruise control system, a pre-collision assist system, and/or the like), an infotainment system (e.g., a navigation system, a multimedia system, an information access system, a heads up display system, and/or the like), an autonomous driving system (e.g., a radar system, a Lidar system, a GPS system, a computer vision system, a vehicle communication system, and/or the like), and/or the like. In some implementations, control device 210-2 can include a message manager for generating, sending, and receiving messages according to a direct communications protocol.

Vehicle 215 includes similar devices to those of vehicle 210. Vehicle 215 includes one or more devices (e.g., telemetry device 215-1, control device 215-2, and/or the like) capable of communicating with a base station (e.g., a base station associated with a different carrier than the carrier associated with base station 205) and/or a network (e.g., a 3G network). For example, telemetry device 215-1 can include a wireless communication device, a telematics device, a radiotelephone, a personal communications system (PCS) terminal (e.g., that can combine a cellular radiotelephone with data processing and data communications capabilities), a smart phone, a laptop computer, a tablet computer, and/or a similar device. In some implementations, telemetry device 215-1 includes one or more M2M devices and/or one or more IoT devices (e.g., any "thing" in the IoT). Telemetry device 215-1 can send traffic to and/or receive traffic from a network (e.g., the 3G network via the base station associated with a different carrier than the carrier associated with base station 205).

Vehicle 215 includes one or more devices (e.g., telemetry device 210-1, control device 210-2, and/or the like) capable of communicating with another vehicle (e.g., vehicle 220). For example, control device 215-2 can use short-range ad hoc and/or direct communications (e.g., LTE PC5 communications, IEEE 802.11p communications, and/or the like) to send traffic to and/or receive traffic from vehicle 210 and/or vehicle 220.

Vehicle 215 includes one or more devices capable of receiving, generating, processing, storing, and/or providing telemetry information and/or service area information (e.g., control device 215-2). For example, control device 215-2 can include an electronics control unit (ECU) (e.g., an engine control module (ECM), a powertrain control module (PCM), a transmission control module (TCM), a brake control module (BCM), a speed control unit (SCU), a telematics control unit (TCU), a transmission control unit (TCU), a battery management system, an electronic power steering control unit (PSCU), or another control module), a sensor (e.g., a fuel pressure sensor, an engine temperature sensor, a tire pressure sensor, or another sensor), or the like.

In some implementations, control device 215-2 can include an embedded device associated with controlling one or more systems or sub-systems of a vehicle, such as an engine electronics system (e.g., a fuel injection rate control system, an emission control system, a turbocharger control system, a throttle control system, and/or the like), a transmission electronics systems (e.g., a gear shift system, a clutch system, and/or the like), a chassis electronics system (e.g., an anti-lock braking system (ABS), a traction control system (TCS), an electronic brake distribution (EBD) system, an electronic stability program (ESP) system, and/or the like), a safety system (e.g., an airbag system, a hill descent control system, an emergency brake assist system, and/or the like), a driver assistance system (e.g., an advanced driver-assistance system (ADAS), a lane assist system, a speed assist system, a blind spot detection system, a park assist system, an adaptive cruise control system, a pre-collision assist system, and/or the like), an infotainment system (e.g., a navigation system, a multimedia system, an information access system, a heads up display system, and/or the like), an autonomous driving system (e.g., a radar system, a Lidar system, a GPS system, a computer vision system, a vehicle communication system, and/or the like), and/or the like. In some implementations, control device 215-2 can include a message manager for generating, sending, and receiving messages according to a direct communications protocol.

Vehicle 220 includes similar devices to those of vehicle 210. Vehicle 220 includes one or more devices (e.g., telemetry device 220-1, control device 220-2, and/or the like) capable of communicating with a base station (e.g., a base station associated with a different carrier than the carrier associated with base station 205) and/or a network (e.g., a 5G network). For example, telemetry device 220-1 can include a wireless communication device, a telematics device, a radiotelephone, a personal communications system (PCS) terminal (e.g., that can combine a cellular radiotelephone with data processing and data communications capabilities), a smart phone, a laptop computer, a tablet computer, and/or a similar device. In some implementations, telemetry device 220-1 includes one or more M2M devices and/or one or more IoT devices (e.g., any "thing" in the IoT). Telemetry device 220-1 can send traffic to and/or receive traffic from a network (e.g., the 3G network via the base station associated with a different carrier than the carrier associated with base station 205).

Vehicle 220 includes one or more devices (e.g., telemetry device 210-1, control device 210-2, and/or the like) capable of communicating with another vehicle (e.g., vehicle 215). For example, control device 220-2 can use short-range ad hoc and/or direct communications (e.g., LTE PC5 communications, IEEE 802.11p communications, and/or the like) to send traffic to and/or receive traffic from vehicle 215.

Vehicle 220 includes one or more devices capable of receiving, generating, processing, storing, and/or providing telemetry information and/or service area information (e.g., control device 220-2). For example, control device 220-2 can include an electronics control unit (ECU) (e.g., an engine control module (ECM), a powertrain control module (PCM), a transmission control module (TCM), a brake control module (BCM), a speed control unit (SCU), a telematics control unit (TCU), a transmission control unit (TCU), a battery management system, an electronic power steering control unit (PSCU), or another control module), a sensor (e.g., a fuel pressure sensor, an engine temperature sensor, a tire pressure sensor, or another sensor), and/or the like.

In some implementations, control device 220-2 can include an embedded device associated with controlling one or more systems or sub-systems of a vehicle, such as an engine electronics system (e.g., a fuel injection rate control system, an emission control system, a turbocharger control system, a throttle control system, and/or the like), a transmission electronics systems (e.g., a gear shift system, a clutch system, and/or the like), a chassis electronics system (e.g., an anti-lock braking system (ABS), a traction control system (TCS), an electronic brake distribution (EBD) system, an electronic stability program (ESP) system, and/or the like), a safety system (e.g., an airbag system, a hill descent control system, an emergency brake assist system, and/or the like), a driver assistance system (e.g., an advanced driver-assistance system (ADAS), a lane assist system, a speed assist system, a blind spot detection system, a park assist system, an adaptive cruise control system, a pre-collision assist system, and/or the like), an infotainment system (e.g., a navigation system, a multimedia system, an information access system, a heads up display system, and/or the like), an autonomous driving system (e.g., a radar system, a Lidar system, a GPS system, a computer vision system, a vehicle communication system, and/or the like), and/or the like. In some implementations, control device 220-2 can include a message manager for generating, sending, and receiving messages according to a direct communications protocol.

MBMS-GW 225 includes one or more devices capable of routing packets related to eMBMS. For example, MBMS-GW 225 can include a traffic transfer device, such as a gateway, a router, a modem, a switch, a firewall, a NIC, a hub, a bridge, a server device, an OADM, or any other type of device that processes and/or transfers traffic. MBMS-GW 225 can receive traffic from a network and/or other network devices, and can send the received traffic to vehicle 210 via base station 205.

BMSC 230 includes one or more devices capable of receiving, generating, storing, processing, and/or providing information associated with providing a service. For example, BMSC 230 can include a server device, a traffic transfer device (e.g., a router, a switch, a hub, etc.), or a similar device. In some implementations, BMSC 230 can allocate bandwidth for providing a multicast service, and/or can instruct other devices associated with providing the multicast service.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
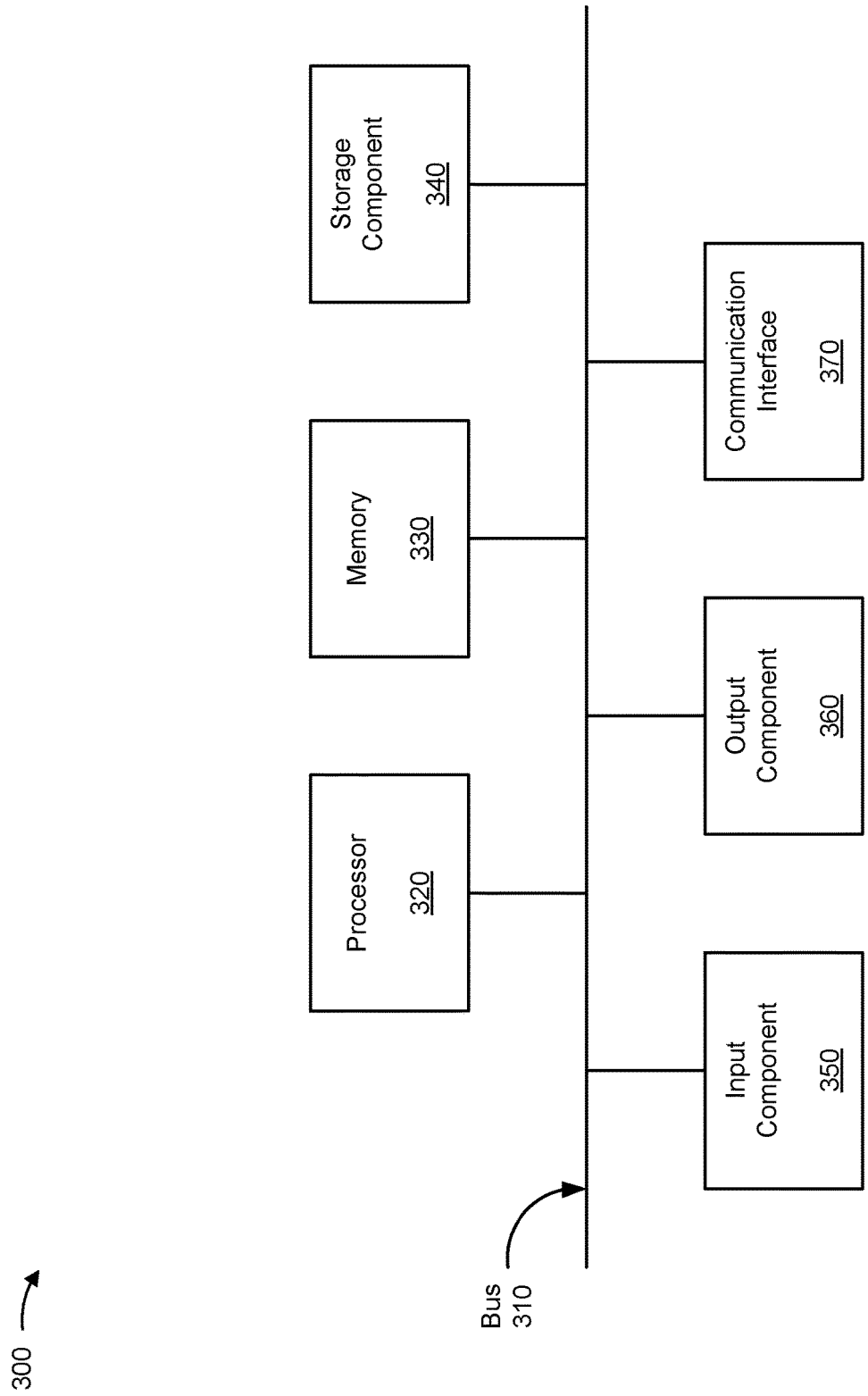
FIG. 3 is a diagram of example components of one or more devices of FIG. 2.

FIG. 3 is a diagram of example components of a device 300. Device 300 can correspond to base station 205, vehicle 210, telemetry device 210-1, control device 210-2, vehicle 215, telemetry device 215-1, control device 215-2, vehicle 220, telemetry device 220-1, and/or control device 220-2. In some implementations, base station 205, vehicle 210, telemetry device 210-1, control device 210-2, vehicle 215, telemetry device 215-1, control device 215-2, vehicle 220, telemetry device 220-1, control device 220-2, MBMS-GW 225, BMSC 230, and/or the like can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
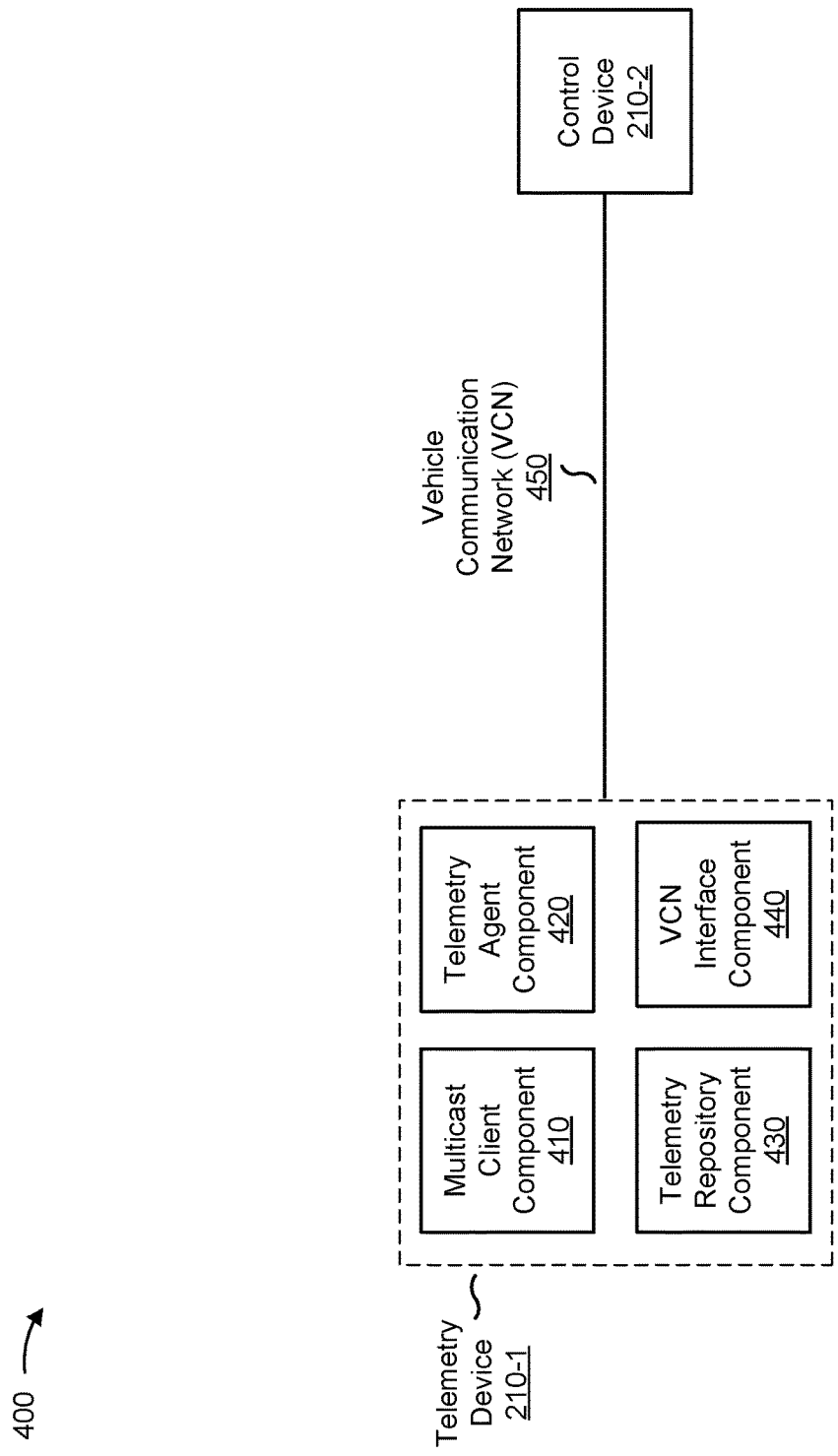
FIG. 4 is a diagram of example components of one or more devices of FIG. 2.

FIG. 4 is a diagram of example components of a device 400. Device 400 can correspond to telemetry device 210-1. In some implementations, vehicle 210 can include one or more devices 400 and/or one or more components of device 400. As shown in FIG. 4, device 400 can include a multicast client component 410, a telemetry agent component 420, a telemetry repository component 430, a VCN interface component 440, a vehicle communication network (VCN) 450, and/or control device 210-2.

Multicast client component 410 includes a component capable of receiving, generating, processing, storing, and/or providing telemetry information and/or information associated with external data sources (e.g., content). For example, multicast client component 410 can receive content from base station 205 and can store the content.

Telemetry agent component 420 includes a component capable of receiving, generating, processing, storing, and/or providing telemetry information and/or content. For example, telemetry agent component 420 can receive telemetry information from control device 210-2 and provide the telemetry information to base station 205. Additionally, or alternatively, telemetry agent component 420 can receive content from multicast client component 410 and provide the content to control device 210-2.

Telemetry repository component 430 includes a component capable of receiving, generating, processing, storing, and/or providing telemetry information and/or content. For example, telemetry repository component 430 can receive, from multicast client component 410, telemetry information and/or content and store the telemetry information and/or content for use by control device 210-2.

VCN interface component 440 includes a transceiver-like component, such as a transceiver and/or a separate receiver and transmitter, that permits multicast client component 410, telemetry agent component 420, and/or telemetry repository component 430 to communicate with control device 210-2 via VCN(s) 450. In some implementations, multicast client component 410, telemetry agent component 420, and/or telemetry repository component 430 can communicate with control device 210-2 via VCN interface component 440 using a particular communication protocol.

VCN 450 includes one or more wired and/or wireless networks. For example, VCN 450 can include a network that allows telemetry device 210-1 (e.g., multicast client component 410, telemetry agent component 420, telemetry repository component 430, and/or VCN interface component 440) to communicate with control device 210-2. In some implementations, VCN 450 can include a vehicle bus.

In some implementations, VCN 450 can operate using a message-based protocol network, such as a Society of Automotive Engineers (SAE) J1850 pulse-width modulation (PWM) protocol network, an SAE J1850 variable pulse-width (VPW) protocol network, an International Standards Organization (ISO) 914102 protocol network, an ISO 14230 Keyword Protocol 2000 (KWP2000) network, an ISO 15765 Controller Area Network (CAN) protocol network (e.g., a CAN bus network), an SAE J2411 Single-Wire CAN (SWC) protocol network, an SAE J19319 protocol network, an ISO 17458 protocol network (e.g., FlexRay), an Ethernet protocol network, or the like. In some implementations, VCN 450 can facilitate the transfer of telemetry information and/or content associated with control device 210-2.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5A:
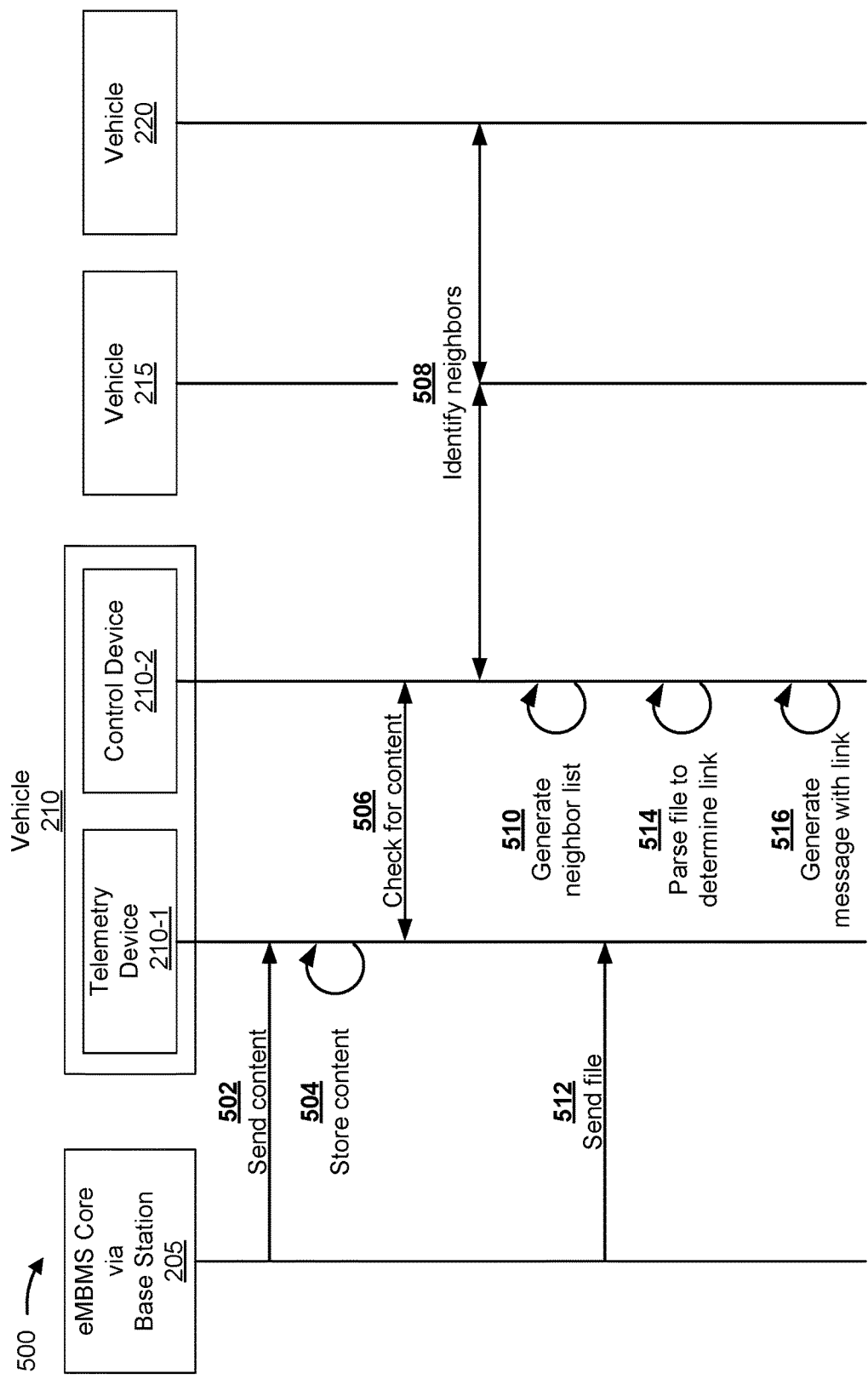
FIGS. 5A-5B are diagrams of a call flow of example operations capable of being performed by one or more devices of FIG. 2 and/or one or more components of one or more devices of FIG. 2.
Figure 5B:
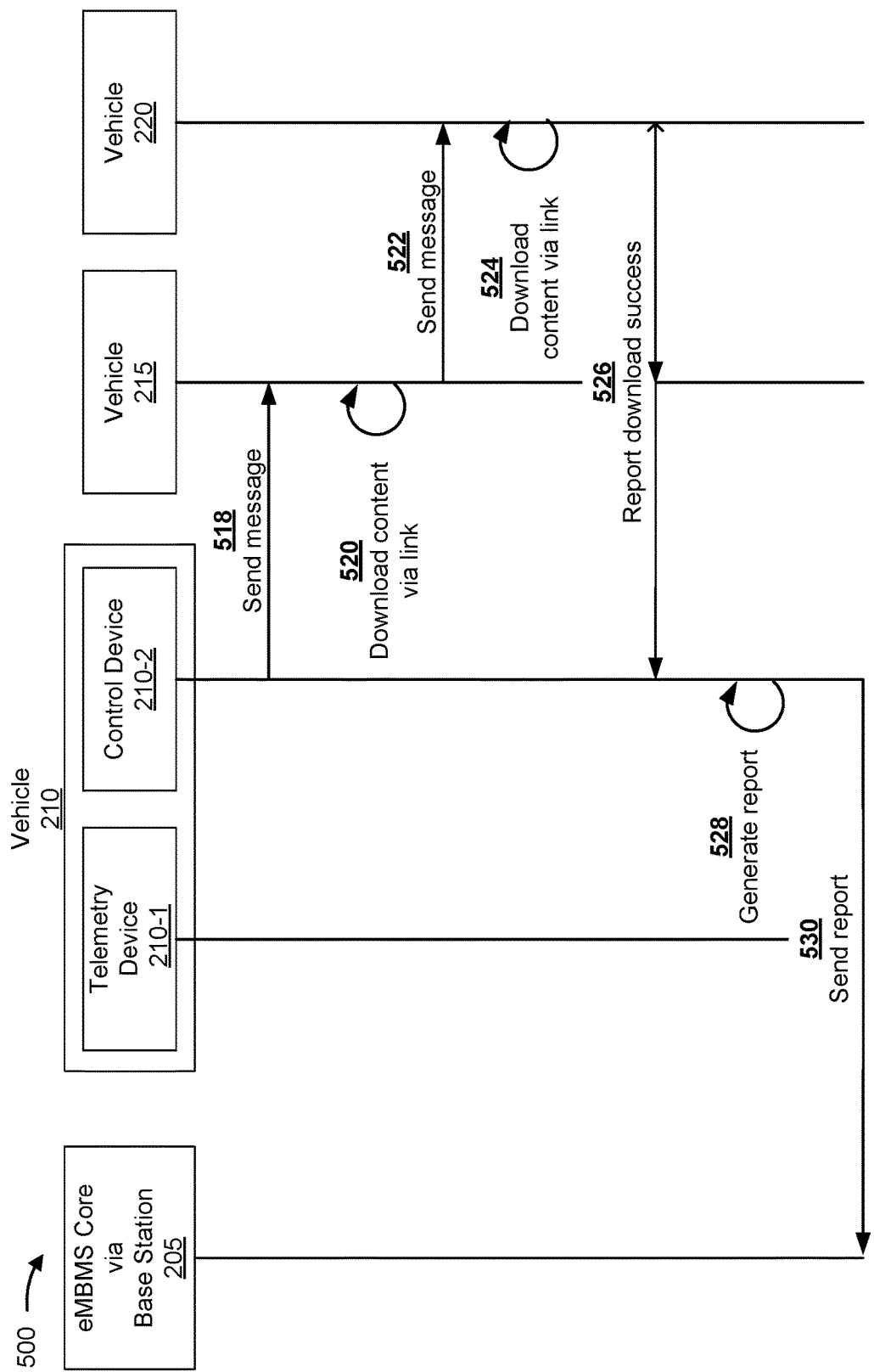

FIGS. 5A-5B are diagrams of an example call flow 500 of example operations capable of being performed by one or more devices of FIG. 2 and/or one or more components of one or more devices of FIG. 2. For example, FIGS. 5A-5B are diagrams of an example call flow 500 for a carrier agnostic relay for delivering information to autonomous vehicles.

As shown in FIG. 5A, and by reference number 502, Evolved Multimedia Broadcast Multicast Services (eMBMS) core via base station 205 can send content to telemetry device 210-1 of vehicle 210 in a similar manner to that described herein in relation to FIG. 1C. As shown by reference number 504, telemetry device 210-1 of vehicle 210 can store the content in a similar manner to that described herein in relation to FIG. 1C. As shown by reference number 506, control device 210-2 of vehicle 210 can check to see if content has been received and stored at telemetry device 210-1 of vehicle 210 in a similar manner to that described herein in relation to FIG. 1C. As shown by reference number 508, control device 210-2 of vehicle 210 can generate and send a message that includes a query (e.g., a second message) to a system (e.g., telemetry device 215-1, control device 215-2, and/or the like) of vehicle 215, which can send the message to a system (e.g., telemetry device 220-1, control device 220-2, and/or the like) of vehicle 220, in a similar manner to that described herein in relation to FIG. 1C. In addition, the system of vehicle 220 can send an identification message (e.g., a third message) to the system of vehicle 215, which can send the identification message to control device 210-2 of vehicle 210, in a similar manner to that described herein in relation to FIG. 1D. As shown by reference number 510, control device 210-2 of vehicle 210 can receive the identification message and generate a neighbor vehicle list in a similar manner to that described herein in relation to FIG. 1D. As shown by reference number 512, the eMBMS core via base station 205 can send a file to telemetry device 210-1 of vehicle 210 in a similar manner to that described herein in relation to FIG. 1E. As shown by reference number 514, control device 210-2 of vehicle 210 can receive the file and parse the file to determine a link to the content in a similar manner to that described herein in relation to FIG. 1E. As shown by reference number 516, control device 210-2 of vehicle 210 can generate a message that includes the link to the content (e.g., a fourth message) in a similar manner to that described herein in relation to FIG. 1E.

As shown in FIG. 5B, and by reference number 518, control device 210-2 of vehicle 210 can send the message that includes the link to the system of vehicle 215 in a similar manner to that described herein in relation to FIG. 1E. As shown by reference number 520, the system of vehicle 215 can receive the message that includes the link and download the content via the link in a similar manner to that described herein in relation to FIG. 1E. As shown by reference number 522, the system of vehicle 215 can send the message that includes the link to vehicle 220 in a similar manner to that described herein in relation to FIG. 1E. As shown by reference number 524, the system of vehicle 220 can receive the message that includes the link and download the content via the link in a similar manner to that described herein in relation to FIG. 1E. As shown by reference number 526, the system of vehicle 220 can send a download status message (e.g., a fifth message) to the system of vehicle 215, which can update and send the download status message to control device 210-2 of vehicle 210 in a similar manner to that described herein in relation to FIG. 1F. As shown by reference number 528, control device 210-2 of vehicle 210 can receive the download status message and create a report (e.g., a sixth message) that includes information identifying vehicle 215 and vehicle 220 and whether vehicle the systems of 215 and vehicle 220 were able to download the content via the link in a similar manner to that described herein in relation to FIG. 1F. As shown by reference number 530, control device 210-2 of vehicle 210 can send the report to the eMBMS core via base station 205 in a similar manner to that described herein in relation to FIG. 1F.

As indicated above, FIGS. 5A-5B are provided merely as an example. Other examples are possible and can differ from what was described with regard to FIGS. 5A-5B.

FIG. 6 is a flow chart of an example process 600 for a carrier agnostic relay for delivering information to autonomous vehicles. In some implementations, one or more process blocks of FIG. 6 can be performed by a control device (e.g., control device 210-2). In some implementations, one or more process blocks of FIG. 6 can be performed by another device or a group of devices separate from or including the control device, such as a base station (e.g., base station 205), a vehicle (e.g., vehicle 210, vehicle 215, vehicle 220, etc.), a telemetry device (e.g., telemetry device 210-1), MBMS-GW 225, BMSC 230, and/or the like.

As shown in FIG. 6, process 600 can include receiving, from a telemetry device, a first message that indicates that a base station transmitted content to the telemetry device (block 610). For example, the control device (e.g., using processor 320, memory 330, storage component 340, input component 350, communication interface 370, and/or the like) can receive, from a telemetry device, a first message that indicates that a base station transmitted content to the telemetry device, as described above in connection with FIGS. 1A-1F.

As further shown in FIG. 6, process 600 can include generating a second message, wherein the second message includes a query (block 620). For example, the control device (e.g., using processor 320, memory 330, storage component 340, and/or the like) can generate a second message, as described above in connection with FIGS. 1A-1F. In some implementations, the second message can include a query.

As further shown in FIG. 6, process 600 can include sending the second message to a remote device via a direct communications interface (block 630). For example, the control device (e.g., using processor 320, memory 330, storage component 340, output component 360, communication interface 370, and/or the like) can send the second message to a remote device via a direct communications interface, as described above in connection with FIGS. 1A-1F.

As further shown in FIG. 6, process 600 can include receiving, based on sending the second message, a third message from the remote device via the direct communications interface, wherein the third message includes first information that identifies the remote device and second information that identifies a neighbor device of the remote device (block 640). For example, the control device (e.g., using processor 320, memory 330, storage component 340, input component 350, communication interface 370, and/or the like) can receive, based on sending the second message, a third message from the remote device via the direct communications interface, as described above in connection with FIGS. 1A-1F. In some implementations, the third message can include first information that identifies the remote device and second information that identifies a neighbor device of the remote device.

As further shown in FIG. 6, process 600 can include generating a fourth message, wherein the fourth message includes a link to the content (block 650). For example, the control device (e.g., using processor 320, memory 330, storage component 340, and/or the like) can generate a fourth message, as described above in connection with FIGS. 1A-1F. In some implementations, the fourth message can include a link to the content.

Alternatively, as further shown in FIG. 6, process 600 can include generating a fourth message, wherein the fourth message includes a link to the content and a device class identifier (block 655). For example, the control device (e.g., using processor 320, memory 330, storage component 340, and/or the like) can generate a fourth message, as described above in connection with FIGS. 1A-1F. In some implementations, the fourth message can include a link to the content and a device class identifier.

As further shown in FIG. 6, process 600 can include sending the fourth message to the remote device via the direct communications interface, wherein sending the fourth message to the remote device causes the remote device to download the content via the link and send the fourth message to the neighbor device, which causes the neighbor device to download the content via the link (block 660). For example, the control device (e.g., using processor 320, memory 330, storage component 340, output component 360, communication interface 370, and/or the like) can send the fourth message to the remote device via the direct communications interface, as described above in connection with FIGS. 1A-1F. In some implementations, sending the fourth message to the remote device can cause the remote device to download the content via the link and send the fourth message to the neighbor device, which can cause the neighbor device to download the content via the link.

As further shown in FIG. 6, process 600 can include receiving, based on sending the fourth message, a fifth message from the remote device via the direct communications interface, wherein the fifth message includes third information that indicates whether the remote device and the neighbor device downloaded the content via the link (block 670). For example, the control device (e.g., using processor 320, memory 330, storage component 340, input component 350, communication interface 370, and/or the like) can receive, based on sending the fourth message, a fifth message from the remote device via the direct communications interface, as described above in connection with FIGS. 1A-1F. In some implementations, the fifth message can include third information that indicates whether the remote device and the neighbor device downloaded the content via the link.

As further shown in FIG. 6, process 600 can include generating, based on receiving the fifth message, a sixth message, wherein the sixth message includes the first information, the second information, and the third information (block 680). For example, the control device (e.g., using processor 320, memory 330, storage component 340, and/or the like) can generate, based on receiving the fifth message, a sixth message, as described above in connection with FIGS. 1A-1F. In some implementations, the sixth message can include the first information, the second information, and the third information.

As further shown in FIG. 6, process 600 can include sending the sixth message to the base station (block 690). For example, the control device (e.g., using processor 320, memory 330, storage component 340, output component 360, communication interface 370, and/or the like) can send the sixth message to the base station, as described above in connection with FIGS. 1A-1F.

Process 600 can include additional aspects, such as any single aspect or any combination of aspects described below and/or in connection with one or more other processes described elsewhere herein.

In some implementations, the remote device can be associated with a first vehicle, and the neighbor device can be associated with a second vehicle. In some implementations, the first information can include a make of the first vehicle, a model of the first vehicle, a model year of the first vehicle, a device class of the first vehicle, and/or a provider of the first vehicle. In some implementations, the second information can include a make of the second vehicle, a model of the second vehicle, a model year of the second vehicle, a device class of the second vehicle, and/or a provider of the second vehicle.

In some implementations, the base station can have transmitted the content to the telemetry device via a Long-Term Evolution (LTE) multicast transmission. In some implementations, when generating the fourth message, the control device can receive an LTE multicast service announcement file, can parse the LTE multicast service announcement file to determine the link to the content, and can create the fourth message to include the link to the content. In some implementations, the link to the content can be a uniform resource locator (URL). In some implementations, the direct communications interface can be a Long-Term Evolution (LTE) PC5 interface Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

In this way, some implementations described herein permit delivery of content to a system (e.g., telemetry device 210-1, control device 210-2, and/or the like) of vehicle 210, a system (e.g., telemetry device 215-1, control device 215-2, and/or the like) of vehicle 215, and a system (e.g., telemetry device 220-1, control device 220-2, and/or the like) of vehicle 220. In this way, some implementations described herein allow the system of vehicle 210 to facilitate delivery of the content, which the system of vehicle 210 received from a base station via a cellular connection, to the system of vehicle 215 and the system of vehicle 220 even if vehicle 215 and vehicle 220 are outside a service area of the base station and/or the system of vehicle 215 and the system of vehicle 220 do not subscribe to a cellular connection service associated with the base station. In this way, some implementations allow for efficient network usage and efficient use of network bandwidth by efficient distribution of the content to the system of vehicle 210, the system of vehicle 215, and the system of vehicle 220. In this way, some implementations require reduced communication and/or signaling relative to communications between the base station and the system of vehicle 210, the system of vehicle 215, and the system of vehicle 220. In this way, some implementations described herein conserve processor and/or memory resources of the systems associated with vehicle 210, vehicle 215, and vehicle 220 and the base station and/or conserve network resources. In this way, some implementations increase the amount of information that is available to vehicle 210, vehicle 215, and vehicle 220, which can improve effectiveness, efficiency, and safety of how vehicle 210, vehicle 215, and vehicle 220 operate.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a device and from a telemetry device associated with a first vehicle, a first message that indicates that a base station transmitted content relating to vehicle operation to the telemetry device;
processing, by the device and based on receiving the first message, the content to affect driving behavior of the first vehicle;
generating, by the device, a second message,
wherein the second message includes a query;
sending, by the device, the second message to a remote device associated with a second vehicle via a direct communications interface;
receiving, by the device and based on sending the second message, a third message from the remote device via the direct communications interface,
wherein the third message includes first information that identifies the remote device and second information that identifies a neighbor device of the remote device,
wherein the neighbor device is associated with a third vehicle;
generating, by the device, a fourth message,
wherein the fourth message includes a link to the content;
sending, by the device, the fourth message to the remote device via the direct communications interface,
wherein sending the fourth message to the remote device causes the remote device to download the content via the link and send the fourth message to the neighbor device, which causes the neighbor device to download the content via the link,
wherein, by downloading the content, the remote device and the neighbor device process the content to affect driving behavior of the second vehicle and the third vehicle, respectively;
receiving, by the device and based on sending the fourth message, a fifth message from the remote device via the direct communications interface,
wherein the fifth message includes third information that indicates whether the remote device and the neighbor device downloaded the content via the link;
generating, by the device and based on receiving the fifth message, a sixth message,
wherein the sixth message includes the first information, the second information, and the third information; and
sending, by the device, the sixth message to the base station.

2. The method of claim 1, wherein sending the fourth message to the remote device comprises:
sending the fourth message to the remote device when the second vehicle is outside a service area of the base station and within a first relay area of the first vehicle.

3. The method of claim 1, wherein the first information includes at least one of:
a make of the second vehicle,
a model of the second vehicle,
a model year of the second vehicle,
a device class of the second vehicle, or
a provider of the second vehicle.

4. The method of claim 1, wherein the second information includes at least one of:
a make of the third vehicle,
a model of the third vehicle,
a model year of the third vehicle,
a device class of the third vehicle, or
a provider of the third vehicle.

5. The method of claim 1, wherein the base station transmitted the content to the telemetry device via a Long-Term Evolution (LTE) multicast transmission.

6. The method of claim 5, wherein generating the fourth message comprises:
receiving an LTE multicast service announcement file;
parsing the LTE multicast service announcement file to determine the link to the content,
wherein the link to the content is a uniform resource locator (URL); and
creating the fourth message to include the link to the content.

7. The method of claim 1, wherein the direct communications interface is a Long-Term Evolution (LTE) PC5 interface.

8. A device, comprising:
one or more memory devices; and
one or more processors, operatively coupled to the one or more memory devices, to:
receive, from a telemetry device associated with a first vehicle, a first message that indicates that a base station transmitted content relating to vehicle operation to the telemetry device;
process the content to affect driving behavior of the first vehicle;
generate a second message,
wherein the second message includes a query;
send the second message to a remote device associated with a second vehicle via a direct communications interface;
receive, based on sending the second message, a third message from the remote device via the direct communications interface, wherein the third message includes first information that identifies the remote device and second information that identifies a neighbor device of the remote device,
        wherein the neighbor device is associated with a third vehicle;
    generate a fourth message,
        wherein the fourth message includes a link to the content;
    send the fourth message to the remote device via the direct communications interface,
        wherein sending the fourth message to the remote device causes the remote device to download the content via the link and send the fourth message to the neighbor device, which causes the neighbor device to download the content via the link,
            wherein, by downloading the content, the remote device and the neighbor device process the content to affect driving behavior of the second vehicle and the third vehicle, respectively;
    receive, based on sending the fourth message, a fifth message from the remote device via the direct communications interface,
        wherein the fifth message includes third information that indicates whether the remote device and the neighbor device downloaded the content via the link;
    generate, based on receiving the fifth message, a sixth message,
        wherein the sixth message includes the first information, the second information, and the third information; and
    send the sixth message to the base station.

9. The device of claim 8, wherein, the one or more processors, when sending the fourth message to the remote device, are to:
    send the fourth message to the remote device when the second vehicle is outside a service area of the base station and within a first relay area of the first vehicle.

10. The device of claim 8, wherein the first information includes at least one of:
    a make of the second vehicle,
    a model of the second vehicle,
    a model year of the second vehicle,
    a device class of the second vehicle, or
    a provider of the second vehicle.

11. The device of claim 8, wherein the second information includes at least one of:
    a make of the third vehicle,
    a model of the third vehicle,
    a model year of the third vehicle,
    a device class of the third vehicle, or
    a provider of the third vehicle.

12. The device of claim 8, wherein the base station transmitted the content to the telemetry device via a Long-Term Evolution (LTE) multicast transmission.

13. The device of claim 12, wherein the one or more processors, when generating the fourth message, are to:
    receive an LTE multicast service announcement file;
    parse the LTE multicast service announcement file to determine the link to the content,
        wherein the link to the content is a uniform resource locator (URL); and
    create the fourth message to include the link to the content.

14. The device of claim 8, wherein the direct communications interface is a Long-Term Evolution (LTE) PC5 interface.

15. A non-transitory computer-readable medium storing instructions, the instructions comprising:
    one or more instructions that, when executed by one or more processors of a device, cause the one or more processors to:
        receive, from a telemetry device associated with a first vehicle, a first message that indicates that a base station transmitted content relating to vehicle operation to the telemetry device;
        process the content to affect driving behavior of the first vehicle;
        generate a second message,
            wherein the second message includes a query;
        send the second message to a remote device associated with a second vehicle via a direct communications interface;
        receive, based on sending the second message, a third message from the remote device via the direct communications interface,
            wherein the third message includes first information that identifies the remote device and second information that identifies a neighbor device of the remote device,
                wherein the neighbor device is associated with a third vehicle;
        generate a fourth message,
            wherein the fourth message includes a link to the content;
        send the fourth message to the remote device via the direct communications interface,
            wherein sending the fourth message to the remote device causes the remote device to download the content via the link and send the fourth message to the neighbor device,
                wherein, by downloading the content, the remote device processes the content to affect driving behavior of the second vehicle;
        receive, based on sending the fourth message, a fifth message from the remote device via the direct communications interface,
            wherein the fifth message includes third information that indicates whether the remote device and the neighbor device downloaded the content via the link;
        generate, based on receiving the fifth message, a sixth message,
            wherein the sixth message includes the first information, the second information, and the third information; and
        send the sixth message to the base station.

16. The non-transitory computer-readable medium of claim 15, wherein, the one or more instructions, that cause the one or more processors to send the fourth message to the remote device, cause the one or more processors to:
    send the fourth message to the remote device when the second vehicle is outside a service area of the base station and within a first relay area of the first vehicle.

17. The non-transitory computer-readable medium of claim 15, wherein the first information includes at least one of:
    a make of the second vehicle,
    a model of the second vehicle,
    a model year of the second vehicle,
    a device class of the second vehicle, or a provider of the second vehicle.

18. The non-transitory computer-readable medium of claim 15, wherein the base station transmitted the content to the telemetry device via a Long-Term Evolution (LTE) multicast transmission.

19. The non-transitory computer-readable medium of claim 18, wherein the one or more instructions, that cause the one or more processors to generate the fourth message, cause the one or more processors to:
  receive an LTE multicast service announcement file;
  parse the LTE multicast service announcement file to determine the link to the content,
    wherein the link to the content is a uniform resource locator (URL); and
  create the fourth message to include the link to the content.

20. The non-transitory computer-readable medium of claim 15, wherein the direct communications interface is a Long-Term Evolution (LTE) PC5 interface.

* * * * *